United States Patent
Shipston et al.

(10) Patent No.: US 6,326,450 B1
(45) Date of Patent: Dec. 4, 2001

(54) ACTIVATED ADHESIVE SYSTEM

(75) Inventors: Adele C. Shipston, Williamsville; Joseph W. Langen, Cheektowaga; Nancy G. Mitchell, Grand Island, all of NY (US)

(73) Assignee: Moore Business Forms, Grand Island, NY (US)

(*) Notice: Subject to any disclaimer, the term of this patent is extended or adjusted under 35 U.S.C. 154(b) by 0 days.

(21) Appl. No.: 08/450,227

(22) Filed: May 25, 1995

Related U.S. Application Data

(62) Division of application No. 08/199,877, filed on Feb. 22, 1994, now abandoned.

(51) Int. Cl.[7] ............................ C08F 20/10; C08F 220/10
(52) U.S. Cl. .................................. 526/318.4; 526/318.44; 526/330
(58) Field of Search ........................... 526/318.4, 318.44, 526/330

(56) References Cited

U.S. PATENT DOCUMENTS

| | | |
|---|---|---|
| Re. 24,906 | 12/1960 | Ulrich . |
| 3,400,103 * | 9/1968 | Samour ............................... 526/318.4 |
| 3,661,618 | 5/1972 | Brookman et al. . |
| 3,669,709 | 6/1972 | Kasugai et al. . |
| 3,897,295 | 7/1975 | Dowbenko et al. . |
| 4,024,038 | 5/1977 | Luc . |
| 4,069,123 * | 1/1978 | Skoultchi ........................... 526/318.5 |
| 4,120,716 | 10/1978 | Bonet . |
| 4,150,170 | 4/1979 | Lazear et al. . |
| 4,153,776 | 5/1979 | Friedlander et al. . |
| 4,181,752 | 1/1980 | Martens et al. . |
| 4,311,759 | 1/1982 | Glennon . |
| 4,379,201 | 4/1983 | Heilmann et al. . |
| 4,640,727 | 2/1987 | Janssen . |
| 4,714,655 | 12/1987 | Bordoloi et al. . |
| 4,755,424 | 7/1988 | Takeoka et al. . |
| 4,876,139 | 10/1989 | Yamamoto et al. . |
| 4,911,867 | 3/1990 | Burlet et al. . |
| 4,935,079 | 6/1990 | Nelson-Ashley et al. . |
| 4,946,728 | 8/1990 | Ikeda et al. . |
| 5,001,002 | 3/1991 | Gribbin et al. . |
| 5,011,867 * | 4/1991 | Mallya ............................... 526/318.5 |
| 5,073,452 | 12/1991 | Satou et al. . |
| 5,079,047 | 1/1992 | Bogaert et al. . |
| 5,100,728 | 3/1992 | Plamthottam et al. . |
| 5,149,586 | 9/1992 | Ishiwata et al. . |

FOREIGN PATENT DOCUMENTS

| | | |
|---|---|---|
| 886003 | 1/1962 | (GB) . |
| 54-53174 | 4/1979 | (JP) . |
| 61-28097 | 2/1986 | (JP) . |

OTHER PUBLICATIONS

Stueben et al., "Ultraviolet Cured Pressure Sensitive Adhesives, I. Acrylate Grafted Polyvinyl Alkyl Ethers," Journal of Radiation Curing, Apr. 1982, pp. 16–19.

Stueben et al., "Ultraviolet Cured Pressure Sensitive Adhesives, II. Monoacrylate Grafted Polyethers," Journal of Radiation Curing, Apr. 1982, pp. 20–23.

* cited by examiner

*Primary Examiner*—Terrel Morris
(74) *Attorney, Agent, or Firm*—Finnegan, Henderson, Farabow, Garrett & Dunner, L.L.P.

(57) ABSTRACT

A method of increasing the tack of a pressure sensitive adhesive by exposing a polymeric pressure sensitive adhesive to an activating treatment, activatable articles containing such an adhesive and adhesive compositions resulting from such an activating treatment. The activatable, polymeric, pressure sensitive adhesive is preferably a water based adhesive prepared by free radical polymerization of acrylic acid, methacrylic acid, acrylate, or methacrylate monomers having from 1 to about 12 carbon atoms. The activating treatment is preferably corona charging or corona charging in combination with uv light.

14 Claims, No Drawings

ACTIVATED ADHESIVE SYSTEM

This is a division of application Ser. No. 08/199,877, filed Feb. 22, 1994 now abandoned.

BACKGROUND OF THE INVENTION

1. Field of the Invention

The present invention relates to a polymeric adhesive that is capable of being made more tacky by exposure to an activating treatment, such as ultraviolet light, corona charging, etc. More specifically, the invention relates to a method of increasing the tack of a pressure sensitive adhesive by exposing an activatable, polymeric, pressure sensitive adhesive to an activating treatment. The invention also relates to activatable articles of manufacture containing such an adhesive and adhesive compositions resulting from such an activating treatment. The invention is particularly related to use of such activatable adhesives with linerless labels, enabling a user to adjust the aggressiveness of the label to meet the requirements of a particular application.

2. Description of Related Art

Pressure sensitive adhesives capable of being made more tacky by exposure to an activating treatment are known in the art. However, the adhesives described in the art are typically monomers or prepolymers that polymerize upon exposure to ultraviolet light or electron beam radiation. These monomers or prepolymers are typically applied and cured immediately on press and are not provided to the user in an uncured form. Adhesive systems using such adhesives suffer from several drawbacks.

One disadvantage of adhesive systems produced by activation of monomers or prepolymers via polymerization is the fact that the monomers or polymers are typically low viscosity fluids that are difficult to bind to a substrate, such as paper, without the use of special binders. As such, when coated onto paper these materials have a tendency to become offset onto equipment, or during handling, onto a user's hands. This can result in a loss of the adhesive material, and can create housekeeping, health and safety problems.

A second disadvantage is that applying such adhesive coatings to substrates in either a continuous or cut sheet format can cause sticking between subsequent sheets in a stack or layers in a roll, making the substrate difficult to separate.

A third disadvantage of such prior art adhesive systems is that they may have a tendency to prematurely polymerize and become undesirably tacky during storage upon exposure to light, heat, and the like.

Other adhesives described by the prior art include hot melt adhesives, which are non-tacky or slightly tacky until activated by heat. These hot melt adhesives suffer from the problem of premature activation by, for example, non-impact printing means, causing the substrate to stick to the printing apparatus or adjacent substrates to stick together.

Also known in the art are rewettable adhesives, which are non-tacky until activated by the application of moisture. Rewettable adhesives suffer from various problems, including that insufficient moisture will result in a faulty or incomplete seal, compromising the integrity of the mailer or business form with which it is used, and that substrates coated with rewettable adhesives have a tendency to curl, a phenomenon known as hygroexpansivity.

Pressure sensitive adhesives in general suffer from the problem of the adhesive having a tendency to migrate off a substrate or form and onto printing equipment. This can cause significant printer downtime for periodic cleaning to remove the adhesive.

The pressure sensitive adhesive of the invention, on the other hand, is a polymer that has sufficient viscosity and stability to be coated onto paper, stored for long periods of time, and subsequently processed by passing through a copier, non-impact printer, printing press, and the like. When desired, the paper coated with the activatable polymer can then be passed through a uv light or corona charging device to activate the adhesive. The paper can then be used, for example, as a label and can be applied to a variety of substrates by light pressure.

Another advantage of the invention is that the use of a liner can be eliminated. As a result, adhesive labels using the activatable adhesive are non-toxic and environmentally friendly, because no liner material has to be sent to a landfill, and also more cost effective because less material is used, shipped and inventoried.

An additional advantage of the invention is that, compared to traditional labels using an adhesive liner, a label incorporating the activatable adhesive of the invention achieves superior performance in a non-impact printer with respect to curl, feeding and toner adhesion.

Additional features and advantages of the invention will be set forth in the written description that follows, and in part will be apparent from the examples and written description or may be learned from the practice of the invention. The advantages of the invention will be realized and attained by the method of increasing the tack of a pressure sensitive adhesive, the activatable article of manufacture, and the pressure sensitive adhesive composition, particularly pointed out in the examples, written description and claims hereof.

SUMMARY OF THE INVENTION

To achieve these and other advantages, and in accordance with the purpose of the invention as embodied and broadly described herein, the present invention, in one aspect, provides a method for increasing the tack of a pressure sensitive adhesive. The method involves introducing a substrate coated over at least a portion of at least one side thereof with a polymeric pressure sensitive adhesive capable of being activated upon exposure to an activating treatment. The coated substrate is then exposed to an activating treatment to activate the polymeric pressure sensitive adhesive, thereby increasing the tack of the adhesive.

The present invention, in accordance with another aspect, provides an activatable article of manufacture. The article comprises a substrate and a polymeric pressure sensitive adhesive coated onto at least a portion of the substrate. The polymeric pressure sensitive adhesive is capable of being activated upon exposure to an activating treatment to become more tacky.

The present invention, in accordance with a further aspect, provides a pressure sensitive adhesive composition. The adhesive composition comprises the reaction product of an activatable, polymeric, pressure sensitive adhesive obtained after exposure to an activating treatment.

The above and other advantages and features of this invention will become apparent upon review of the following description in conjunction with the examples.

DETAILED DESCRIPTION OF THE PREFERRED EMBODIMENTS

In accordance with the present invention, as embodied and broadly described herein, a method is provided for increasing the tack of a pressure sensitive adhesive. The method involves introducing a substrate coated over at least a portion of at least one side thereof with a polymeric pressure sensitive adhesive that is capable of being activated upon exposure to an activating treatment. The substrate may be paper, vinyl, foil, films, i.e., acetate polyester, polyethylene, high molecular weight polymers, or any other synthetic label stock, but is preferably paper. Paper having a basis weight of up to 100 pounds per resin can be used as the substrate, but 20 to 24 pound stock is preferred. The adhesive can be coated over a portion or all of one or both sides of the substrate, but is preferably coated on one side for use as a label. While it is preferable to coat the adhesive over the entire face of the substrate, the substrate may also be spot coated. For example, it is preferred that the receipt portion of a label not be coated with adhesive. The adhesive can be coated on the substrate by any means known in the art, such as wire wound rod, gravure, reverse roll, hot melt, and the like.

The polymeric pressure sensitive adhesive can be any polymer adhesive that is capable of being activated upon exposure to an activating treatment. As used herein, the terms "activate" or "activated" refers to increasing the tackiness of an adhesive by mechanisms other than polymerization, such as, for example, an oxidation or chain scission reaction. Polymeric pressure sensitive adhesives that can be used in accordance with the invention include, for example, homopolymers or copolymers of acrylic acid, acrylates, methacrylic acid, methacrylates, natural rubbers or polyethers; and preferably is a water based adhesive prepared by free radical polymerization of acrylic acid, methacrylic acid, acrylate, or methacrylate monomers having from 1 to about 12 carbon atoms. Non-activatable materials may also be present in combination with the activatable adhesive. These non-activatable materials are preferably polymeric and act as binders and/or matrices for the activatable adhesive. Preferably, the polymeric pressure sensitive adhesive of the invention includes a polymer or copolymer made from 70 to 100% of a soft monomer, such as 2-ethylhexyl acrylate, isooctyl acrylate, isodecyl acrylate, and the like, 0 to 6% of a functional monomer, such as acrylic acid, and the like, and 0–30% of a hard monomer, such as vinyl acetate, and the like. The activatable polymer may be crosslinked with a crosslinking agent such as, for example, trimethylolpropane trimethacrylate. Other additives, such as sensitizers, tackifiers, slip agents, pigments, offset material, and the like, may also be present in the adhesive of the invention.

The activatable, polymeric, pressure sensitive adhesive of the invention may be produced by, for example, free radical polymerization of the monomer(s) in aqueous polyvinyl alcohol in the presence of an initiator or a crosslinking agent. It is preferred that the monomer and aqueous polyvinyl alcohol phases be present in approximately equal parts by weight. The initiator may be any initiator capable of initiating free radical polymerization including, for example, benzoyl peroxide (BPO), azobisisobutyronitrile (AIBN), ammonium persulfate/sodium metabisulfite, t-amyl peroxypivalate or t-amyl peroxy(2-ethylhexanoate). The initiator should be present in amounts sufficient to promote free radical polymerization. The initiator may also promote formation of an emulsion. Crosslinking agents that may be used in the invention include any of those crosslinking agents known in the art, such as, for example, trimethylolpropane trimethacrylate. The crosslinking agent(s) may be present at levels ranging from 300 to 3,000 ppm, based on the weight of the monomer. To produce the activatable, polymeric, pressure sensitive adhesive of the invention, the monomer(s) are first mixed together with the initiator and either emulsified or suspended in the aqueous polyvinyl alcohol. Next, the solution is heated to initiate the reaction and held at elevated temperatures, followed by cooling.

In accordance with the invention, the coated substrate is exposed to an activating treatment to activate the polymeric pressure sensitive adhesive material, thereby increasing the tack of the adhesive material. The activating treatment of the invention may be, for example, ultraviolet light, corona charging, ultrasound, or combinations thereof. A preferred activating treatment is corona charging or corona charging in combination with ultraviolet light. Heating may also be used to accelerate the activation treatment. Nickel flake and/or titanium dioxide may be added to the adhesive material to improve the charging of the corona, decreasing exposure time. The nickel flake/titanium dioxide improves charging by facilitating the absorption of the activation energy at greater rates through the adhesive.

In accordance with the invention, the polymeric pressure sensitive adhesive material may be non-tacky prior to the activation treatment, but is preferably lightly tacky. Thus, the user could purchase both a non-tacky or lightly tacky facestock that could be used as a plain sheet of paper, i.e., for instance, it could be passed through a photocopier, non-impact printer or printing press. After processing by the user and just prior to application, the sheet could be passed through the corona charging and/or uv light device to activate the adhesive. The sheet could then be used as a label and applied to a variety of substrates with light pressure.

An example of a corona charging treatment that can be used to activate the polymeric pressure sensitive adhesive material of the invention is exposure to an Enercon Dyne-A-Mite electrical discharge treater at a speed of, for example, one inch per second, at a distance of, for example, ¼ inch to ¹⁄₁₆ inch, preferably ⅛ inch, from the sheet surface.

An example of a uv light treatment that can be used to activate the polymeric, pressure sensitive adhesive material of the invention is exposure to a 30 watt/in., 365 wavelength uv lamp (available from Cole-Parmer Instrument Company, Niles, Ill.) for a period of 30 seconds to 10 minutes at, for example, one to two inches from the sheet surface.

The present inventors have found that the amount of uv energy that is able to penetrate the adhesive coating layer decreases exponentially with the depth of the layer. For example, if 90% of the uv energy is absorbed in the top mil of the adhesive coating, then only about 9% will be initially absorbed in the second mil. In order to increase the energy provided to the second mil of the coating, it would be necessary to increase the amount of the initial radiation on the order of 10 times. However, there is a limit on the amount the rate of activation can be increased by increasing the amount of energy supplied. Therefore, it is preferable, particularly in label applications, to utilize a relatively thin coating, on the order of about 0.01 to 2 mil, more preferably about 1 mil.

Although applicants do not wish to be bound by any theory of the invention, it is believed that the activation upon corona exposure is a result of surface modification of the adhesive material via generation of polar surface active groups. These surface active groups undergo oxidation, which increases the surface energy, allowing better wetting and promoting adhesion. The corona treatment also is believed to have the effect of breaking down crosslinking of the polymer. It is further believed by the applicants that the activation upon exposure to UV is caused by the breaking of polymer chains to form reactive free radicals, which can react to form polar carboxyl or hydroxyl groups, thus increasing wetting tension.

In accordance with the present invention, as embodied and broadly described herein, an activatable article of manufacture is provided. The activatable article includes a substrate, as described earlier herein, and coated onto at least a portion of the substrate, a polymeric pressure sensitive adhesive. The polymeric pressure sensitive adhesive, also described earlier herein, is capable of being activated upon exposure to an activating treatment to become more tacky. The polymeric pressure sensitive adhesive may be non-tacky prior to exposure to the activating treatment or may be initially tacky and rendered more tacky by the activating treatment.

The activatable article of the invention is particularly useful as an activatable label. The polymeric pressure sensitive adhesive may be coated onto a portion of a substrate such as paper to produce the activatable label. The user of the activatable label could purchase a non-tacky, slightly tacky or moderately tacky facestock that could be altered by exposure to the activating treatment to render the facestock tacky or more tacky. Thus, by the use of the activating treatment, the tack or peel strength can be adjusted so that, for example, a non-tacky sheet of paper could be converted into a repositionable label, a removable label or a permanent label; a repositionable label could be converted into a removable or permanent label; or a removable label could be converted into a permanent label. The amount of increase in tack is determined by the intensity of the corona charge or uv light treatment, the duration of exposure to the treatment, the type of adhesive materials used, speed of the substrate through the activating equipment, distance of the activating source from the substrate, porosity of the substrate, etc. Obviously, the longer the exposure time and the greater the intensity of the treatment, the more tacky the adhesive becomes.

The activatable article of the invention may also include a release compound coated onto the side of the substrate opposite to the polymeric pressure sensitive adhesive, often called the "face." The release coating is a material that imparts a lower surface energy to the face of the label. Any of those release materials commonly used in the art can be utilized with the activatable article of the invention. Preferred release materials include, for example, silicone resins and chrome complexes of fatty acids. The use of a release material would be appropriate in those instances where the activatable adhesive is initially tacky.

The activatable article of the invention may also include a tie coating interposed between the substrate and the polymeric pressure sensitive adhesive. This tie coating improves the adhesion of the polymeric pressure sensitive adhesive to the substrate. The tie coat may include, for example, an aqueous dispersion of a pigment, such as silica, with a binder material, such as a polyvinyl alcohol.

The following examples further illustrate advantageous features of the present invention and are illustrative of the various features of the present invention.

EXAMPLES 1–12

In the examples, 20% by weight solid slurries were prepared of various activatable adhesives of the invention. The adhesives were prepared by suspending or emulsifying a monomer, ethylhexyl acrylate (EHA) or isodecyl acrylate (IDA), in an aqueous solution of 2% polyvinyl alcohol at about equal parts of monomer and aqueous phase. Then the initiator was added. Optionally, trimethylolpropane trimethacrylate (TMPTMA) was then added. The solution was then heated to a temperature of 168–170° F. to initiate the reaction and held at elevated temperatures for 2 to 4 hours. The slurry was then cooled to room temperature and, optionally, other additives such as nickel flake or $TiO_2$ were added. The adhesives thus prepared were removable/repositionable adhesives, preferably repositionable.

These slurries were coated on 24# paper using a No. 22 wire rod. The coated samples were cut into 1 inch strips and were subjected to corona exposure using a 2 inch wide, 15 KV Enercon treater. The samples were exposed to two passes of corona treatment at a distance of ⅛ inch from the coated surface and a speed of 1 inch/sec. Some of the samples were exposed to uv treatment after exposure to corona. The uv treatment used the Cole-Parmer equipment described earlier herein and involved exposure for a period of 30 seconds to one minute at a distance of one inch from the sheet surface. Samples were immediately placed on stainless steel (SS) plates and peel values were obtained according to Moore Business Forms test method 25, which is derived from ASTM test method D 3330M-90. After treatment, the adhesives were either a removable, repositionable or permanent adhesive.

The following Table illustrates the results of stainless steel peel values for Examples 1–12 obtained before corona treatment, after corona treatment, and in Examples 10–12, after uv treatment. In the Table, AIBN is azobisisobutyronitrile, BPO is benzoyl peroxide, Lupersol 575 is t-amyl peroxy(2-ethylhexanoate), Lupersol 554 is t-amyl peroxypivalate and TMPTMA is trimethylolpropane trimethacrylate. The percentages are dry weight % based on dry weight % of monomer.

TABLE 1

| | | SS Peels | | |
|---|---|---|---|---|
| Sample | | No Corona | Corona | Corona + UV |
| Ex. 1 | EHA + 0.1% BPO | 3.35 | 9.62 | |
| Ex. 2 | EHA + 0.2% BPO | 2.71 | 8.9 | |
| Ex. 3 | EHA + 0.3% BPO | 3.09 | 7.96 | |
| Ex. 4 | EHA + 0.4% BPO | 2.4 | 7.04 | |
| Ex. 5 | EHA + 5% Lupersol 554 | 3.3 | 6.85 | |
| Ex. 6 | EHA + 0.1% AIBN + 0.14% Lupersol 554 | 4.0 | 8.2 | |
| Ex. 7 | EHA + 0.035% BPO + 0.11% Lupersol 575 | 3.31 | 10.64 | |
| Ex. 8 | IDA + 0.21% BPO | 3.13 | 4.78 | |
| Ex. 9 | EHA + TMPTMA (2000 ppm) | 0.60 | 6.93 | |
| Ex. 10 | EHA + 0.2% BPO + 0.3% Nickel Flake | 4.6 | 8.4 | 12.98 |
| Ex. 11 | EHA + 0.2% BPO | 3.68 | 10.64 | 8.50 |
| Ex. 12 | EHA + 0.3% TiO2 + 0.140% BPO | 3.20 | 8.29 | 10.0 |

It will be apparent to those skilled in the art that various modifications and variations can be made in the method, article of manufacture and adhesive composition without departing from the spirit or scope of the invention. Thus, it is intended that the present invention cover the modifications and variations of this invention provided that they come within the scope of the appended claims and their equivalents.

What is claimed is:

1. A pressure sensitive adhesive comprising the reaction product of an activatable, polymeric, composition obtained after exposure to an activating treatment, wherein said activatable composition is non-tacky prior to exposure to the activating treatment.

2. The adhesive of claim 1, wherein the activatable, polymeric, composition comprises polymers or copolymers of acrylates, methacrylates, acrylic acid, methacrylic acid, rubbers or polyethers.

3. The adhesive of claim 1, wherein the activatable, polymeric, composition is water based and is prepared by free radical polymerization of acrylic acid, methacrylic acid, acrylate, or methacrylate monomers having from 1 to about 12 carbon atoms.

4. The adhesive of claim 1, wherein the activatable, polymeric, composition comprises a polymer or copolymer based on 70 to 100% of a soft monomer, 0 to 6% of a functional monomer and 0–30% of a hard monomer.

5. The adhesive of claim 4, wherein the soft monomer is selected from 2-ethylhexyl acrylate, isooctyl acrylate and isodecyl acrylate.

6. The adhesive of claim 5, wherein the 2-ethylhexyl acrylate is crosslinked with trimethylolpropane trimethacrylate.

7. The adhesive of claim 4, wherein the functional monomer is acrylic acid.

8. The adhesive of claim 4, wherein the hard monomer is vinyl acetate.

9. The adhesive of claim 1, wherein the activatable, polymeric, composition is coated onto at least a portion of one side of a substrate.

10. The composition of claim 1, wherein the activating treatment comprises ultraviolet light, corona charging, ultrasound or combinations thereof.

11. The composition of claim 10, wherein the activating treatment further comprises heating.

12. The composition of claim 10, wherein the activating treatment is corona charging.

13. The composition of claim 10, wherein the activating treatment is corona charging in combination with ultraviolet light.

14. The composition of claim 10, wherein the activating treatment is ultraviolet light.

* * * * *

UNITED STATES PATENT AND TRADEMARK OFFICE
CERTIFICATE OF CORRECTION

PATENT NO.    : 6,326,450 B1
DATED         : December 4, 2001
INVENTOR(S)   : Shipston et al.

It is certified that error appears in the above-identified patent and that said Letters Patent is hereby corrected as shown below:

<u>Title page,</u>
Item [75], Inventors, "Joseph W. Langen" should read -- Joseph W. Langan --

Signed and Sealed this

Twelfth Day of November, 2002

Attest:

Attesting Officer

JAMES E. ROGAN
*Director of the United States Patent and Trademark Office*